United States Patent [19]
Thornburgh

[11] 3,911,882
[45] Oct. 14, 1975

[54] QUICK HEAT MANIFOLD ASSEMBLY
[75] Inventor: William F. Thornburgh, Rochester, Mich.
[73] Assignee: General Motors Corporation, Detroit, Mich.
[22] Filed: Apr. 15, 1974
[21] Appl. No.: 460,962

[52] U.S. Cl. .................. 123/122 AB; 123/52 MV; 123/122 AC
[51] Int. Cl.² ............... F02M 31/00; F02M 31/08; F02M 31/12
[58] Field of Search... 123/122 AB, 122 AC, 122 R, 123/122 H, 51 M, 57 MV

[56] References Cited
UNITED STATES PATENTS

| | | | |
|---|---|---|---|
| 1,637,768 | 8/1927 | Dimond | 123/122 AB |
| 2,259,480 | 10/1941 | Morris | 123/122 AB |
| 2,651,507 | 9/1953 | Heinecke | 123/122 AB |
| 3,780,715 | 12/1973 | Flitz | 123/122 AB |
| 3,814,071 | 6/1974 | Buchwald | 123/122 AB |
| 3,831,568 | 8/1974 | Heimburg | 123/122 R |

FOREIGN PATENTS OR APPLICATIONS

| | | | |
|---|---|---|---|
| 593,468 | 5/1925 | France | 123/122 AB |
| 633,563 | 10/1927 | France | 123/122 AB |

Primary Examiner—Wendell E. Burns
Attorney, Agent, or Firm—J. C. Evans

[57] ABSTRACT

A quick heat manifold including vertical riser bores for supplying air-fuel mixture to an induction plenum having a floor with an opening therein closed by a sealed combination cover and heat exchanger assembly. The assembly includes inner and outer sheet metal covers having a corrugated fin sandwiched therebetween to define a plurality of separate exhaust gas passes. The inner cover is located within the induction plenum to evaporate fuel droplets accumulated therein and includes openings for directing exhaust heat from exhaust crossover ports through the corrugated fin exhaust passes to produce a fast warm-up of the air-fuel mixture during engine start.

3 Claims, 5 Drawing Figures

QUICK HEAT MANIFOLD ASSEMBLY

This invention relates to quick heat manifolds and more particularly to quick heat manifolds having a hot plate located vertically below riser bores of an inlet manifold of an engine for evaporating fuel droplets accumulated therein.

Under cold start engine conditions, fuel droplets are formed in the air-fuel mixture directed into inlet manifolds. In order to improve engine performance and cold start emission characteristics, it has been proposed to include a relatively large area plate located between the induction plenum of the inlet manifold and an exhaust crossover passage to heat the air-fuel mixture during engine start so as to evaporate fuel droplets before they pass to the engine cylinders. In such proposals, it is commonplace to include an opening in the floor of the induction passageway which is closed by a thin metal plate that serves to transfer heat from the exhaust crossover passageway to the fuel droplets. In such cases, a cast iron cover is connected to the underside of the inlet manifold to secure the thin hot plate in place with respect to the induction passage.

In order to produce faster warm up of the thin plate it is desirable to have heat exchanger fins located thereon within the exhaust crossover passageway. In the past, it has been necessary to closely control tolerances between the plate with the fins thereon and a cast iron cover in order to produce a plurality of exhaust gas passes through the heat exchanger for transferring energy therefrom to the heated thin metal plate.

An object of the present invention is to provide a sealed combination cover and heat exchanger assembly that will produce a faster warm up of the plate to evaporate fuel droplets in the air-fuel mixture prior to passage into the engine cylinders.

A further object of the present invention is to improve heated manifolds for evaporating fuel droplets during cold engine starts by the provision of a combination cover and heat exchanger assembly made up of sheet metal parts including an inner cover that defines the hot spot between the induction passageway and exhaust crossover ports and wherein an outer sheet metal cover is connected to the first cover and sealed with respect thereto to form an enclosure for a corrugated heat exchanger fin having bends in the corrugation maintained in contact with the respective covers to define a plurality of open ended exhaust crossover passages within the enclosure each communicated with an exhaust crossover port through openings formed in the inner cover member of the assembly.

Still another object of the present invention is to provide an improved sealed combination cover and heat exchanger assembly for use in a quick heat inlet manifold for an engine wherein a pair of sheet metal covers are interconnected to form an enclosure having a corrugated heat exchanger fin located therein in contact with both of the covers and defining a plurality of open ended exhaust gas passages in communication with exhaust crossover ports through openings in one of the covers and wherein the assembly closes an opening formed in the floor of the induction plenum to the engine cylinder and wherein the outer cover of the assembly is spaced with respect to a sealed tappet gallery cover to define an air chamber between the outer cover of the heat exchanger and the tappet gallery to serve as a heat insulator to reduce oil temperature within the tappet gallery and to insure that maximum heat is transferred through the inner cover into the incoming air-fuel mixture so as to evaporate fuel droplets therein prior to passage into the cylinders of the engine.

Further objects and advantages of the present invention will be apparent from the following description, reference being had to the accompanying drawings wherein a preferred embodiment of the present invention is clearly shown.

Figure 1:
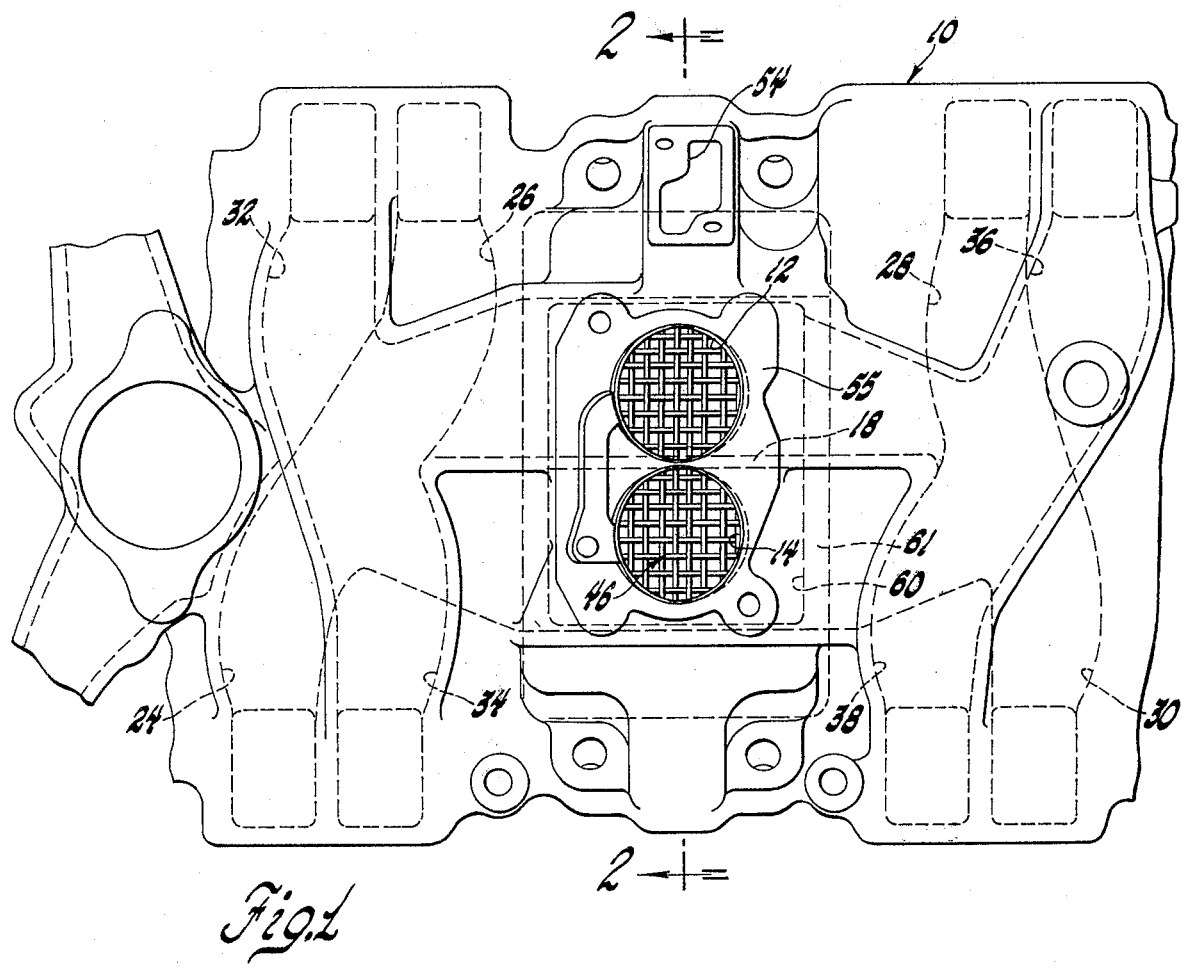
FIG. 1 is a view in elevation of an inlet manifold including the present invention.
Figure 2:
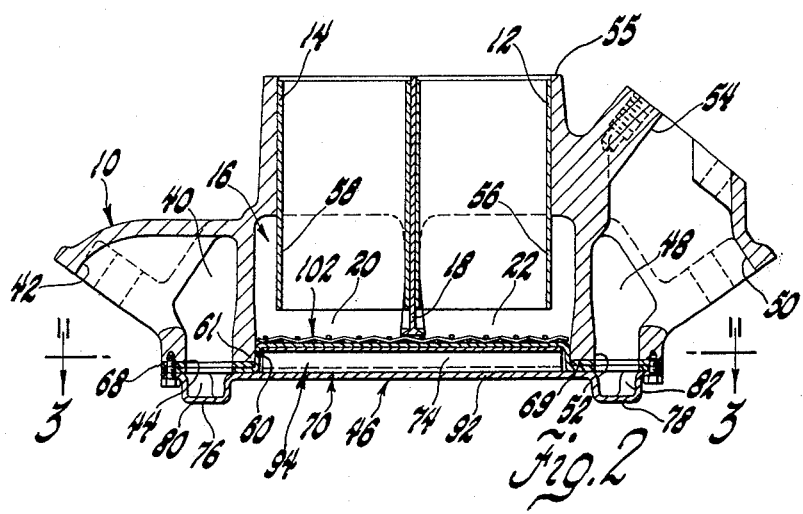
FIG. 2 is a vertical sectional view taken along the line 2—2 of FIG. 1 looking in the direction of the arrows.
Figure 3:
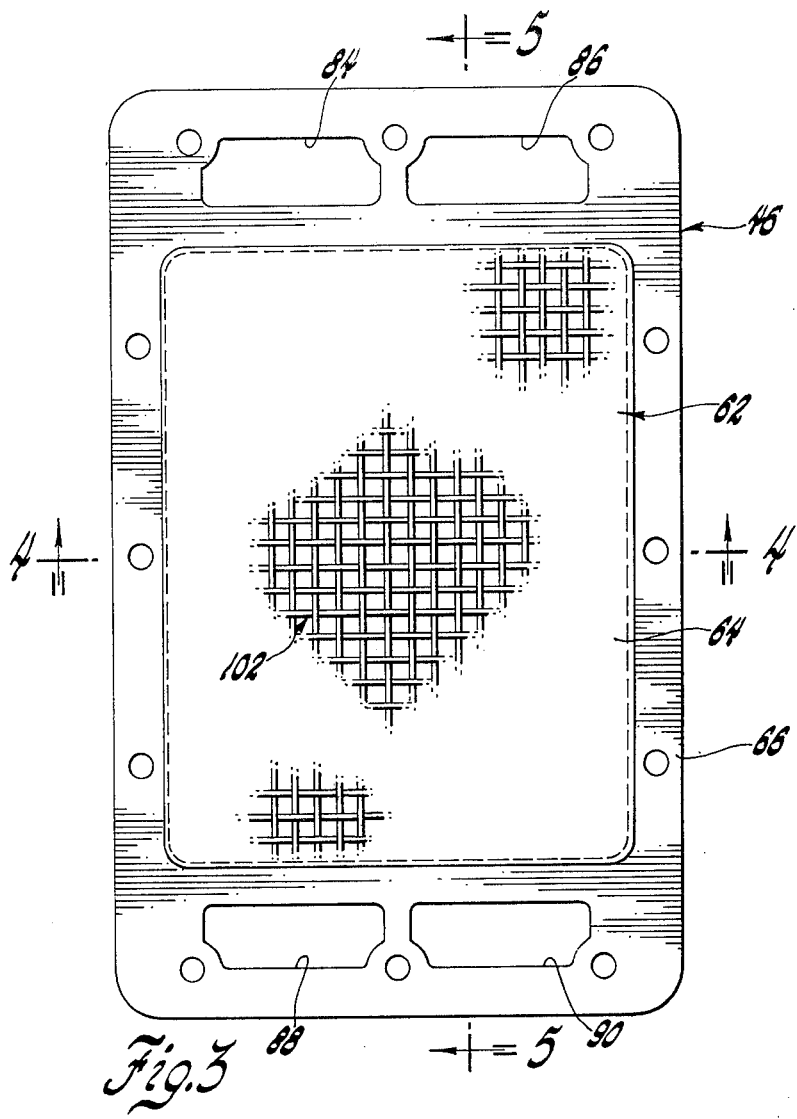
FIG. 3 is a top elevational view of an improved sealed combination cover and heat exchanger assembly.

Referring first to FIGS. 1 and 2, an intake manifold 10 is illustrated including a pair of vertical riser bores 12, 14 opened to an induction plenum 16 divided by means of a separator wall 18 into a pair of chambers 20, 22. The chamber 20 of the induction plenum is connected forwardly (leftwardly as viewed in FIG. 1) to a pair of transverse runners 24, 26 and is connected rearwardly (rightwardly as viewed in FIG. 1) to another pair of transverse runners 28, 30. Similarly, the induction plenum chamber 22 is connected forwardly to a pair of transverse runners 32, 34 and rearwardly to another pair of transverse runners 36, 38. The intake manifold 10 further includes an exhaust crossover passage 40 having an inlet opening 42 adapted to be connected to the exhaust side of one bank of cylinders of a V-8 engine and an outlet port 44 for supplying exhaust heat to a sealed combination cover and heat exchanger assembly 46 constructed in accordance with the present invention. Likewise, the intake manifold 10 includes a second exhaust crossover passage 48 having an inlet port 50 thereon adapted to be connected to the exhaust side of a second bank of cylinders of the engine and an outlet port 52 in communication with the assembly 46. The crossover passageway further is in communication with an exhaust port 54 in the intake manifold 10 for directing exhaust from the assembly 46 to an exhaust pipe not shown.

The intake manifold 10 includes a throttle plate pad 55 on which a carburetor is adapted to be connected for supplying an air-fuel mixture into each of the vertical riser bores 12, 14.

As shown in FIG. 2, riser tubes 56, 58 are located in the riser bores 12, 14 respectively to direct the air-fuel mixture toward the bottom of the induction plenum 16 in the direction of an opening 60 formed in the floor 61 of the induction plenum 16 below the riser bores 12, 14. The opening 60 is closed by the cover assembly 46.

More particularly, the assembly 46 includes an inner cover 62 having a bent segment 64 located inwardly of the plenum 16 to define a surface across the planar extent of the opening 60 against which air-fuel mixture from the riser tubes 56, 58 is impinged. The inner cover 62 further includes a peripheral flange 66 thereon on which is supported a gasket 68 which is held in sealed engagement with a surface 69 on the base of the intake manifold 10 to seal between the induction plenum 16 and the exhaust crossover passages 40, 48. The inner cover is a sheet metal stamping preferably of 409 stainless steel having a thickness of 0.0235 inches. The assembly 46 further includes an outer cover 70 of 0.0847 inch thick A.S.T.M. A619 steel sheet metal having a peripheral flange 72 that is brazed to the flange 66 of the inner cover 62 continuously along the full perimeter thereof to define a peripherally sealed enclosure 74. The outer cover 70 includes a pair of side channels 76, 78 that are bent downwardly with respect to the inner cover 62 to form passages 80, 82 respectively along the width of the assembly 46 between the crossover passages 40, 48. The passage 80 in the cover 70 is communicated with the exhaust crossover passage 40 by means of a plurality of openings 84, 86 in one side of the inner cover 62 and the passage 82 in the cover 70 is in communication with the port 52 of the exhaust gas passage 48 through a plurality of openings 88, 90 on the opposite side of the inner cover 62. The channel portions 76, 78 of the cover 70 are joined by a flat segment 92 which defines the base of the enclosure 74 between the channel passages 80, 82 in spaced relationship to the bent segment 64 of inner cover 62.

Figure 4:
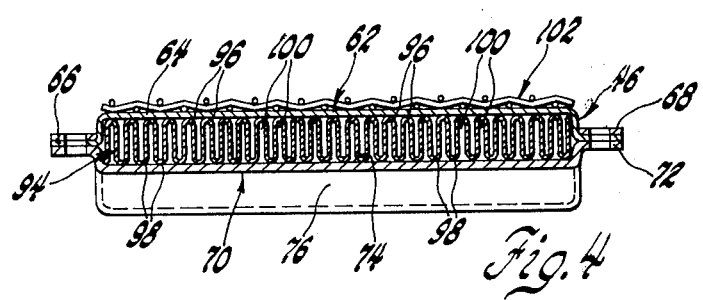
FIG. 4 is a vertical sectional view taken along the line 4—4 of FIG. 3 looking in the direction of the arrows.
Figure 5:
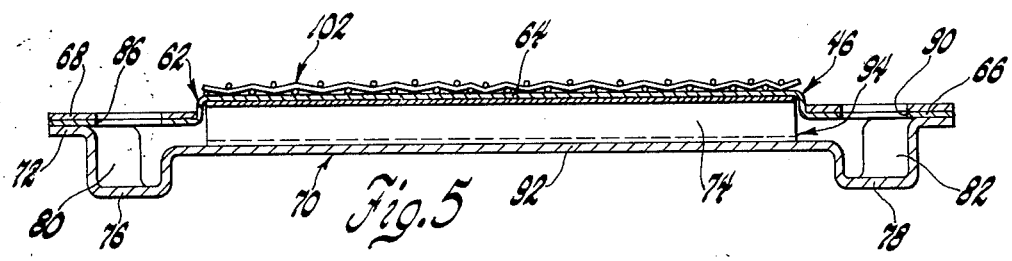
FIG. 5 is a vertical sectional view taken along the line 5—5 of FIG. 3 looking in the direction of the arrows.

One feature of the present invention is that the flat segment 92 and the bent segment 64 of the inner cover define surfaces for support of a heat exchanger fin 94 sandwiched between the inner cover 62 and the outer cover 70 to improve transfer of exhaust heat from the crossover passages 40, 48 to the bent segment 64 for evaporating any fuel droplets accumulated thereon. More particularly, the heat exchanger fin 94 in the present invention is formed as a corrugation between the inner side walls of the bent segment 64 as best shown in FIG. 4 and including a first plurality of bends 96 therein in contact with the inner surface of the bent segment 64 and a second plurality of bends 98 therein in contact with the inner surface of the flat segment 92 of cover 70. The fin 94 is 0.008 inches thick; 0.5 inches in height and has 20 fins per inch.

This location of the corrugated fin 94 maintains a close dimensional control between the inner and outer cover and the bends of the heat exchanger fins to help insure that most of the exhaust gas passes through a separate plurality of open ended exhaust gas passes 100 to effect a better exchange of exhaust gas heat through the corrugated fin segment 94 to the bent segment 64 of the inner cover 62. Additionally, the assembly 46 includes a wire mesh screen 102, 0.035 inch diameter, 4 × 4 mesh 409 stainless steel, brazed to the upper surface of the bent segment 64 to define a rough surface on the cover 64 that serves to retain fuel droplets on the upper surface thereof as they are impinged thereagainst after passing through the riser tubes 56, 58.

In operation on cold engine start, exhaust heat is directed from one bank of cylinders through the exhaust passage 40 thence through the exhaust crossover passage port 44 and through the openings 84, 86 of the inner cover 62 into the channel passage 80 from whence the exhaust gas is directed through the open ends of the plurality of exhaust gas passes 100 in the corrugated fin 94 which transfers exhaust heat directly into the bent segment 64 at a point underlying the riser tubes 56, 58. The exhaust flow thence passes into the channel passage 82 and outwardly of the openings 88, 90 in the inner cover into the exhaust crossover passage 48 to be discharged through the exhaust port 54. As a result, exhaust heat is quickly directed to the bent segment 64 which will increase in temperature quickly to evaporate any fuel droplets in the intake air-fuel mixture prior to passage thereof through the aforedescribed transverse runners through the intake ports of the engine cylinders.

Following cold start, heat riser valve means in an exhaust pipe (not shown) from the bank of cylinders connected to the crossover passage 42 will open thereby causing exhaust flow from the bank of cylinders connected to the port 42 to flow directly through the exhaust pipe on that bank of cylinders. Accordingly, the only exhaust gas flow through the plurality of exhaust gas passes 100 in the assembly 46 will be in the form of gas pulses from each of the banks of cylinders which will produce substantially reduced exhaust heating of the bent segment 64 of the inner cover 62 thereby to reduce the temperature of the plate so that it will not undesirably increase the temperature of the air-fuel mixture prior to passage into the transverse runners once the engine cold start phase of operation is terminated following which a reduced number of fuel droplets will be passed into the induction passage. Furthermore, any reduced number of fuel droplets will be evaporated by the increased temperature of the intake manifold following the cold start phase of operation.

While the embodiments of the present invention, as herein disclosed, constitute a preferred form, it is to be understood that other forms might be adopted.

What is claimed is:

1. A quick heat manifold assembly comprising a manifold casting having a vertical riser bore therein, means including a casting floor forming an induction plenum within said manifold casting, means forming a plurality of transverse runners in said casting in communication with said induction plenum for directing air-fuel mixture to engine cylinders, an opening in said casting floor underlying said vertical riser bore, a sandwiched heat exchanger unit closing said opening including an inner sheet metal cover located inwardly of said hole and underlying said vertical bore and an imperforate outer sheet metal cover directed outwardly of said opening in spaced parallel relationship with said inner sheet metal cover, said inner and outer sheet metal covers each having a peripheral flange thereon joined together, means for bonding said joined together flanges continuously around the perimeter of said exchanger unit to form a peripherally sealed enclosure therein, an annular gasket carried by the peripheral flange of said inner cover, means securing said unit to said casting to locate said gasket in sealing engagement with said casting a plurality of corrugated fins supported within said enclosure having a first plurality of bends in contact with the inner cover and a second plurality of bends in contact with the outer cover to form a separate plurality of open ended exhaust gas passes between said inner and outer cover, means forming openings through said inner cover in communication with opposite ends of said plurality of exhaust gas passes, and means in said casting for directing hot exhaust from engine cylinders through said inner cover openings for flow through said exhaust gas passes to heat said inner cover below said vertical riser bores whereby fuel droplets from said riser bores are evaporated on contact with said inner cover prior to passage through said transverse induction runners.

2. In a quick heat manifold assembly of the type including a manifold casting having a vertical riser bore therein for directing air-fuel mixture into an induction plenum and wherein transverse runners are formed in the casting for directing air-fuel mixture from the induction plenum to engine cylinders the improvement comprising: an induction plenum floor having an opening therein underlying the vertical riser bores, a sandwiched heat exchanger having an inner sheet metal cover and an outer imperforate sheet metal cover, said inner and outer covers being spaced from one another in spaced parallelism to form a low profile enclosure therebetween, each of said inner and outer covers having a peripheral flange thereon joined through the perimeter thereof, means for bonding said flanges to one another to seal the perimeter of said enclosure, means forming exhaust gas ports in said casting, means for securing the flanges of said inner and outer covers to said casting to locate said inner cover in sealed relationship with said floor opening, means forming a plurality of spaced openings through said inner cover in communication with said exhaust openings for directing exhaust gas through said exchanger enclosure, a corrugated sheet metal heat transfer fin located within said enclosure including a first plurality of bends thereon in engagement with said inner cover and a second plurality of bends therein in contact with said outer cover to form a plurality of separate exhaust passes between said spaced openings through said inner cover whereby exhaust gas from the manifold exhaust ports is directed into said enclosure and through said separate exhaust passes for heating said inner cover to increase the temperature thereof for causing fuel droplets from the vertical bore to evaporate thereon prior to passage through the transverse induction runners.

3. A unitary heat exchanger assembly for association with an engine manifold casting of the type including vertical bores and exhaust heat crossover passages comprising: means forming an induction plenum with a base opening therein, an inner cover having a bent segment thereon adapted to be inserted inwardly of the induction plenum opening, a peripheral flange formed continuously around the bent segment, an imperforate outer cover including a peripheral flange joined to the peripheral flange of said inner cover, means for bonding said flanges to form a sealed joint around their perimeter, a pair of channel segments on said outer cover on opposite sides thereof extending along the length of said outer cover, a flat segment on said outer cover joining said channel segments thereof, said flat segment being located in spaced parallel relationship to said bent segment of said inner cover, means forming a plurality of openings through said inner cover flange in communication with the interior of each of said channel segments, a corrugated fin sandwiched between said bent segment and said flat segment, said corrugated fin including a first plurality of bends in engagement with the bent segment of said inner cover and a second plurality of bends in contact with said flat segment of said outer cover to form a plurality of separate open ended exhaust gas passes in communication with the interior of said channel segments of said outer cover, said openings in the flange of said inner cover serving to direct exhaust gas from exhaust crossover ports into the interior of said channel segments thence through said separate exhaust gas passes for heating said bent segment of said inner cover whereby fuel droplets from the vertical riser bore of the exhaust manifold are evaporated prior to passage through said induction plenum into the cylinders of an engine.

* * * * *